United States Patent
Nishimura

(10) Patent No.: US 11,323,611 B2
(45) Date of Patent: *May 3, 2022

(54) MOBILE TERMINAL

(71) Applicant: MAXELL, LTD., Kyoto (JP)

(72) Inventor: Ryuji Nishimura, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,958

(22) Filed: Dec. 28, 2020

(65) Prior Publication Data

US 2021/0120172 A1 Apr. 22, 2021

Related U.S. Application Data

(63) Continuation of application No. 16/311,132, filed as application No. PCT/JP2017/020460 on Jun. 1, 2017, now Pat. No. 10,911,661.

(30) Foreign Application Priority Data

Jun. 23, 2016 (JP) .................................. 2016-124538

(51) Int. Cl.
 *H04N 5/232* (2006.01)
 *G03B 17/02* (2021.01)
 (Continued)

(52) U.S. Cl.
 CPC ......... *H04N 5/23216* (2013.01); *G03B 17/02* (2013.01); *G03B 17/18* (2013.01);
 (Continued)

(58) Field of Classification Search
 CPC ...... G03B 11/046; G03B 13/02; G03B 17/02; G03B 17/18; G03B 17/20;
 (Continued)

(56) References Cited

U.S. PATENT DOCUMENTS

2002/0008765 A1  1/2002 Ejima et al.
2002/0039491 A1  4/2002 Nanjo et al.
(Continued)

FOREIGN PATENT DOCUMENTS

JP    09-215012 A   8/1997
JP    2001-136499 A  5/2001
(Continued)

OTHER PUBLICATIONS

Non-Final Office Action issued in U.S. Appl. No. 16/311,132, dated Mar. 18, 2020.
(Continued)

*Primary Examiner* — Amy R Hsu
(74) *Attorney, Agent, or Firm* — McDermott Will & Emery LLP

(57) ABSTRACT

A mobile terminal in which an imaging unit is provided on a front surface side and a display unit and a sensor are provided on a back surface side includes a signal processing unit which, from a signal output by the imaging unit, generates information to be displayed by the display unit, and a control unit into which a signal from the sensor is input and which controls the signal processing unit. A display state of the display unit based on the control performed by the control unit includes a first display state for display in a first display region if no detection signal is being input from the sensor, and a second display state for display in a second display region if a detection signal is being input from the sensor.

17 Claims, 9 Drawing Sheets

(51) Int. Cl.
*G03B 17/18* (2021.01)
*G03B 17/20* (2021.01)

(52) U.S. Cl.
CPC .............. *G03B 17/20* (2013.01); *H04N 5/232* (2013.01); *H04N 5/23218* (2018.08); *H04N 5/23293* (2013.01); *H04N 5/23299* (2018.08); *H04N 5/232127* (2018.08); *H04N 5/232933* (2018.08); *H04N 5/232945* (2018.08); *H04N 5/23245* (2013.01)

(58) Field of Classification Search
CPC ......... H04N 5/232127; H04N 5/23216; H04N 5/23245; H04N 5/23293; H04N 5/232933; H04N 5/232945; H04N 5/23299
See application file for complete search history.

(56) References Cited

U.S. PATENT DOCUMENTS

| | | | |
|---|---|---|---|
| 2008/0079837 A1 | 4/2008 | Masubuchi | |
| 2012/0154442 A1* | 6/2012 | Takaoka | H04N 5/232933 345/634 |
| 2014/0118600 A1* | 5/2014 | Son | H04N 5/23222 348/333.11 |
| 2014/0240579 A1* | 8/2014 | Park | H04N 5/232939 348/333.11 |
| 2015/0002418 A1* | 1/2015 | Okumura | H04N 7/147 345/173 |
| 2016/0182945 A1* | 6/2016 | Kim | H04N 21/812 725/32 |
| 2016/0277671 A1* | 9/2016 | Smeyers | B60R 1/04 |
| 2017/0111567 A1* | 4/2017 | Pila | H04N 5/23216 |

FOREIGN PATENT DOCUMENTS

| | | |
|---|---|---|
| JP | 2001-320610 A | 11/2001 |
| JP | 2002-010112 A | 1/2002 |
| JP | 2006-157171 A | 6/2006 |
| JP | 2010-212876 A | 9/2010 |
| JP | 2012-089973 A | 5/2012 |

OTHER PUBLICATIONS

Notice of Allowance issued in U.S. Appl. No. 16/311,132, dated Sep. 30, 2020.
International Search Report issued in corresponding International Patent Application No. PCT/JP2017/020460, dated Sep. 5, 2017, with English Translation.
Non-Final Office Action issued in U.S. Appl. No. 16/311,132, dated Dec. 18, 2018.

* cited by examiner

F I G. 4
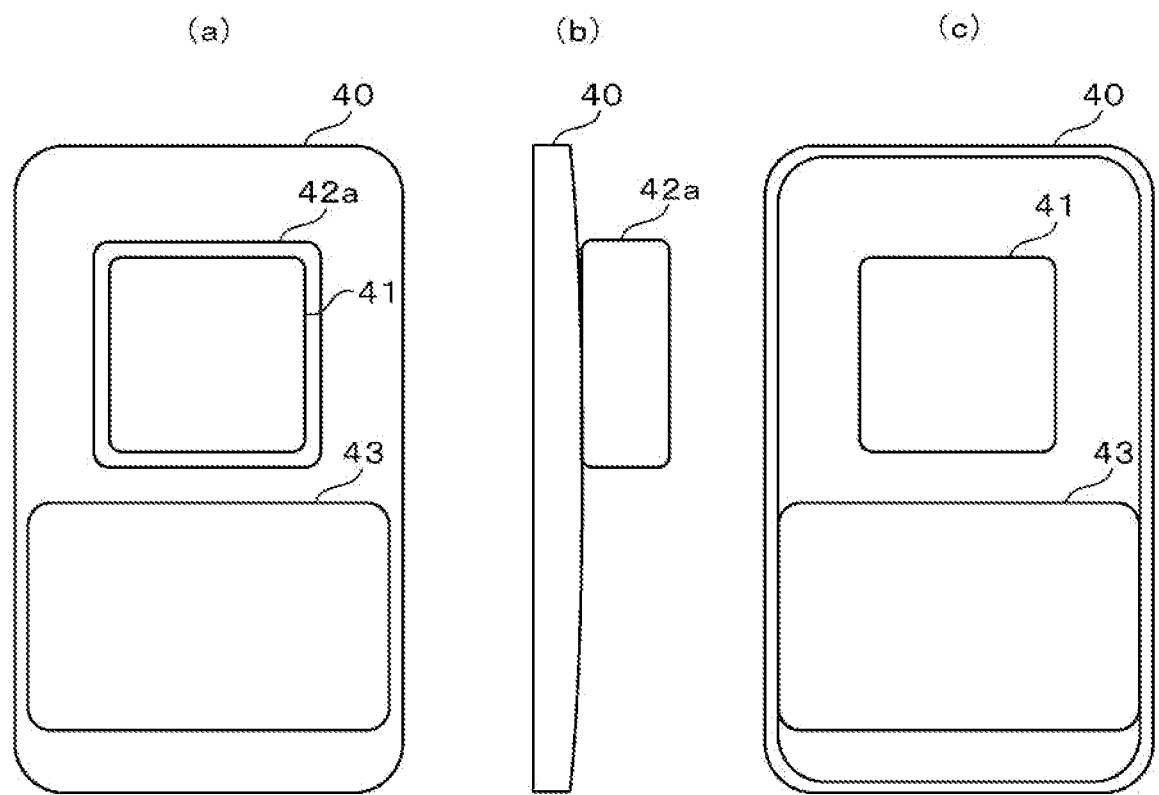
F I G. 5
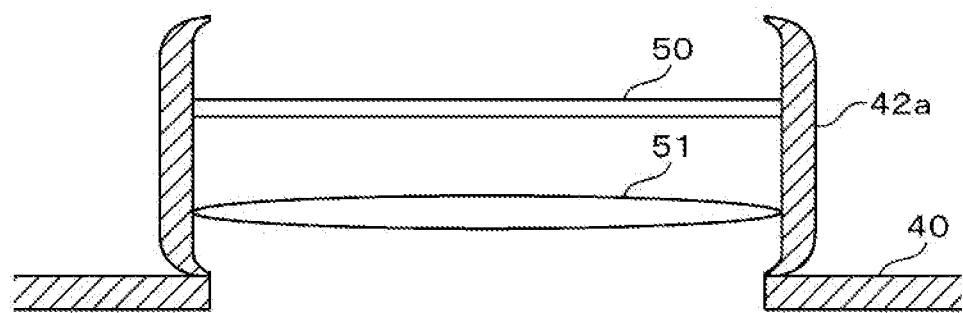

MOBILE TERMINAL

This application is a continuation of U.S. application Ser. No. 16/311,132, filed Dec. 18, 2018, which is the U.S. National Phase under 35 U.S.C. § 371 of International Application No. PCT/JP2017/020460, filed on Jun. 1, 2017, which in turn claims the benefit of Japanese Application No. 2016-124538, filed Jun. 23, 2016, the disclosures of which are incorporated by reference herein.

TECHNICAL FIELD

The present invention relates to a mobile terminal having an imaging unit and a display.

BACKGROUND ART

A mobile terminal of the related art, having an imaging unit (a camera) generally has a communication function, so that the mobile terminal is capable of transmitting images photographed by the camera to the outside through a telephone line or a network and is easy to share the images among users. Such a mobile terminal usually has a display such as a liquid crystal on a back surface, and a user holds the terminal when performing photographing by the camera, and can perform photographing while monitoring the images displayed on the display from a certain distance away during the photographing.

For example, Patent Documents 1 and 2 disclose such mobile terminals. On the other hand, in addition to such a display, an imaging apparatus such as a digital camera is an apparatus having an electronic viewfinder such that a user can observe the photographed images by looking into the electronic viewfinder. For example, Patent Document 3 discloses the electronic viewfinder.

CITATION LIST

Patent Document

Patent Document 1: JP 2001-136499 A
Patent Document 2: JP 2006-157171 A
Patent Document 3: JP 2002-10112 A

SUMMARY OF THE INVENTION

Problems to be Solved by the Invention

However, the mobile terminals disclosed in Patent Documents 1 and 2 have a problem that external light is incident on a display in bright environments such as outdoors, making it difficult for the images on the display to be viewed. Further, the electronic viewfinder disclosed in Patent Document 3 is easy to shield light and easy to monitor images even in bright environments such as outdoors, whereas apparatuses having the electronic viewfinder has a problem that the apparatuses are difficult to be downsized and thin and in addition to the display, cost of electronic components of the electronic viewfinder is increased.

Accordingly, an object of the present invention is to control the display of a mobile terminal such that a viewer including a finder portion can be used for the mobile terminal.

Solutions to Problems

In order to solve the problems, the present invention adopts, for example, the configurations described in the claims. An example thereof is a mobile terminal in which an imaging unit is provided on a front surface side and a display unit and a sensor are provided on a back surface side, including: a signal processing unit which, from a signal output by the imaging unit, generates information to be displayed by the display unit; and a control unit into which a signal from the sensor is input and which controls the signal processing unit, in which a display state of the display unit based on the control performed by the control unit includes a first display state for display in a first display region if no detection signal is being input from the sensor, and a second display state for display in a second display region if a detection signal is being input from the sensor.

Effects of the Invention

According to the present invention, it is possible to perform display suitable for a viewer including a finder portion, so that the viewer may be used for the mobile terminal.

BRIEF DESCRIPTION OF THE DRAWINGS

FIG. 4 is a diagram illustrating an example of a viewer of Embodiment 1.

FIG. 5 is a diagram illustrating an example of a structure of a finder portion of the viewer.

MODE FOR CARRYING OUT THE INVENTION

Hereinafter, embodiments of the present invention will be described with reference to the drawings.

Embodiment 1

Figure 1:
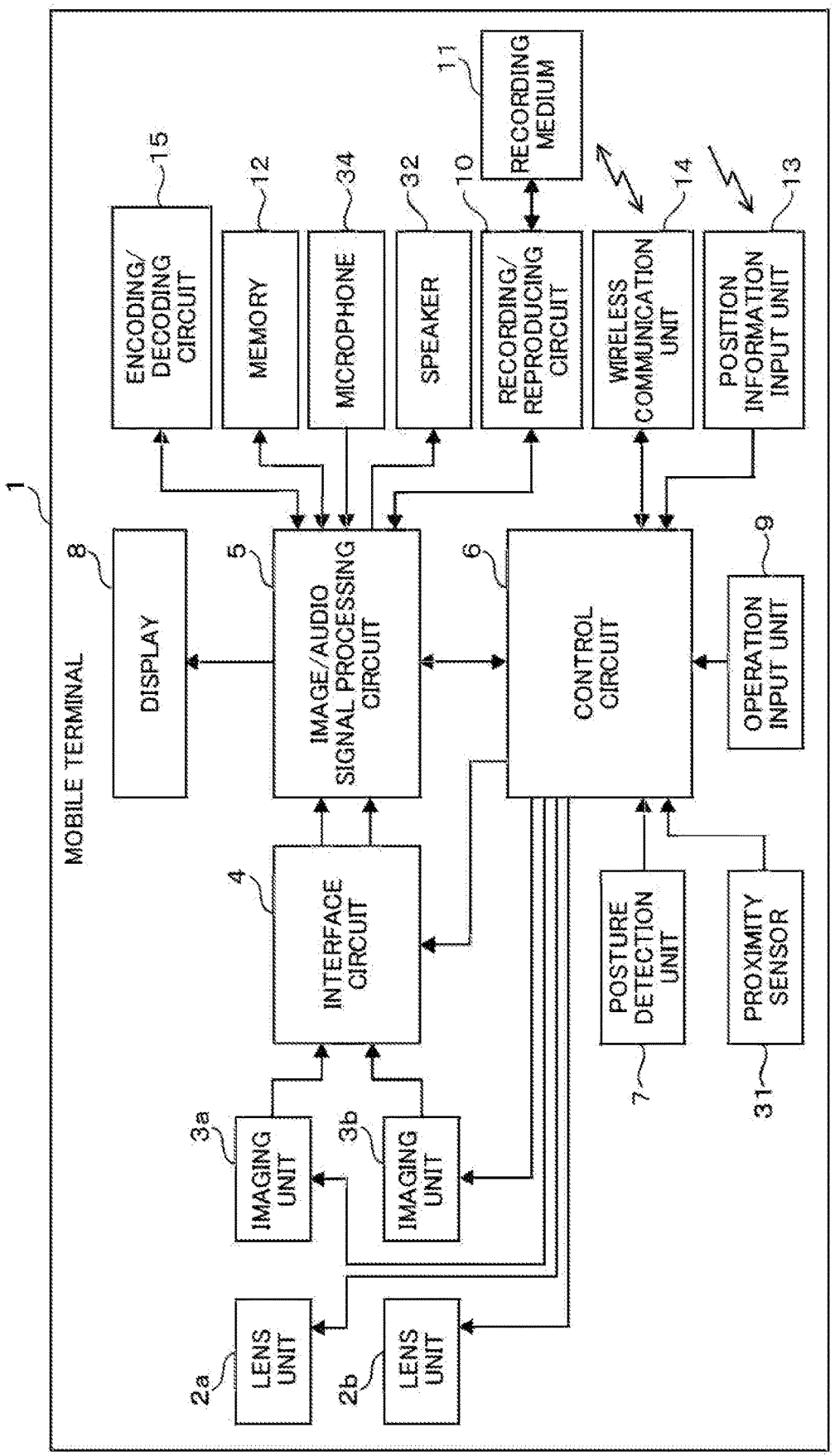
FIG. 1 is a block diagram illustrating an example of a configuration of a mobile terminal of Embodiment 1.

FIG. 1 is a block diagram illustrating an example of a configuration of a mobile terminal 1 according to Embodiment 1. A lens unit 2a and an imaging unit 3a are a rear camera disposed on the front surface of the mobile terminal 1 and are generally used for ordinary photographing such as landscape. A lens unit 2b and an imaging unit 3b are a front camera disposed on the back surface of the mobile terminal 1, and are used for so-called self-photographing.

Each of the lens units 2a and 2b is configured with a plurality of lenses including a focus lens, and a control circuit 6 controls a position of the focus lens to perform a focusing operation. The imaging units 3a and 3b include an imaging sensor configured with a CMOS, a CCD, or the like. Photoelectric conversion elements as an imaging sensor are two-dimensionally disposed on an imaging surface of the imaging units 3a and 3b, and an optical image of a subject, which is input through the lens units 2a and 2b and formed on the imaging surface, is photoelectrically converted into an imaging signal.

The imaging units 3a and 3b include an AD conversion circuit that converts an analog signal into a digital signal, and output a digitized imaging signal. Further, the imaging units 3a and 3b may include an imaging sensor in which pixels for a phase difference AF (autofocus) are disposed, so that it is intended to speed up the AF. The imaging units 3a and 3b may include a memory, so that an interval until the next imaging is shortened.

Incidentally, in a case where the imaging units 3a and 3b do not include the AD conversion circuit, the AD conversion circuit may be provided outside the imaging units 3a and 3b. The control circuit 6 controls the imaging units 3a and 3b, and the lens units 2a and 2b according to an operation mode of the mobile terminal 1, in addition to the focusing operation.

An interface circuit 4 outputs either or both of input signals from the imaging units 3a and 3b to an image/audio signal processing circuit 5 according to the operation mode of the mobile terminal 1. The control circuit 6 also controls this operation mode. The image/audio signal processing circuit 5 performs various image signal processing such as filtering, amplification according to sensitivity setting, white balance correction, and the like on the input signal from the interface circuit 4.

The image/audio signal processing circuit 5 generates moving image data or still image data as image data for display or image data for recording from the signal subjected to image signal processing, according to the operation mode. Here, the image data for display may be scaled up or down as an image. The image data for display is output to a display 8, and the image data for recording is output to an encoding/decoding circuit 15.

The image/audio signal processing circuit 5 may input the encoded or decoded image data from the encoding/decoding circuit 15 to be output to a recording/reproducing circuit 10, or may generate the image data for display to be output to the display 8. Under the control of the control circuit 6, the image/audio signal processing circuit 5 may generate image data of texts and graphics to be output to the display 8, or may adjust the brightness of the display 8.

Further, in addition to a circuit for performing image signal processing, the image/audio signal processing circuit 5 also includes a circuit for performing audio signal processing, and performs predetermined audio signal processing such as encoding on an input signal from a microphone 34. Then, in a case where an encoded audio signal is input, the audio signal is decoded to be output to a speaker 32. The microphone 34 and the speaker 32 may be used for speech communication, and the audio signal may be transmitted to and received from a telephone line by a wireless communication unit 14 through the image/audio signal processing circuit 5 and the control circuit 6.

Incidentally, the image/audio signal processing circuit 5 may be an LSI integrated into one chip with another circuit, or may be one independent LSI. Then, there may be provided a circuit including two systems of circuits for processing the imaging units 3a and 3b depending on the performance of the imaging units 3a and 3b, and capable of simultaneously performing two systems of signal processing. Further, a memory 12 that is a DRAM, a flash memory, or the like may be used as a temporary buffer memory.

The encoding/decoding circuit 15 encodes moving image data or still image data, or decodes the encoded data. Instead of the image/audio signal processing circuit 5, an encoding/decoding circuit 15 may encode or decode the audio signal. The recording/reproducing circuit 10 writes data input from the image/audio signal processing circuit 5 into a recording medium 11, or reads out the data stored in the recording medium 11 to be output to the image/audio signal processing circuit 5. Incidentally, data to be read from or written to may be any encoded data.

The control circuit 6 inputs information from each unit of a posture detection unit 7, an operation input unit 9, a position information input unit 13, and a proximity sensor 31, and controls each unit of the lens units 2a and 2b, the imaging units 3a and 3b, and the interface circuit 4 to input and output information with the image/audio signal processing circuit 5 and the wireless communication unit 14. Further, the control circuit 6 may control the image/audio signal processing circuit 5 and the wireless communication unit 14, or may control the display 8, the encoding/decoding circuit 15, and the recording/reproducing circuit 10, through the image/audio signal processing circuit 5.

Further, the control circuit 6 may directly control the display 8, the encoding/decoding circuit 15, and the recording/reproducing circuit 10 by using a control line (not illustrated). Incidentally, the control circuit 6 may be a processor, or may execute a program stored in a memory (not illustrated) or a memory incorporated in the processor.

The wireless communication unit 14 is a circuit that communicates with the Internet or the like by wireless communication. Wireless communication may be a telephone line, a wireless LAN, or the like. The position information input unit 13 is a circuit that acquires the position information of the mobile terminal 1 by a GPS or wireless communication to output the acquired position information to the control circuit 6. The posture detection unit 7 is a circuit that detects gravity by an acceleration sensor or detects rotation by an angular velocity sensor to output the detected information to the control circuit 6.

The proximity sensor 31 is a sensor that detects an object approaching the mobile terminal 1 and is a sensor that mainly detects a face to be in close to the mobile terminal 1 for speech communication. Since the proximity sensor 31 of the present embodiment also detects approach other than the approach of the face, it is preferable that the proximity sensor 31 is an infrared type proximity sensor or the like for detecting the approach of an object other than a human body.

The operation input unit 9 receives an operation input from a user. Specifically, as described later, the operation input unit includes a touch panel, a power button, and a shutter. However, the operation input unit is not limited thereto and may include various dedicated buttons. The display 8 is, for example, a display panel such as a liquid crystal panel or an organic EL panel. It is preferable that the display 8 and the touch panel of the operation input unit 9 are integrated. In the following description, the touch panel of the operation input unit 9 is also referred to as the display 8 unless otherwise mentioned.

Incidentally, the mobile terminal 1 may be a general smartphone, a tablet, or the like.

The operation mode of the mobile terminal 1 includes at least a photographing mode and a reproducing mode. First, operations in the photographing mode will be described. The control circuit 6 detects an activation instruction of the photographing mode by an operation on the operation input unit 9 (touch panel) and the like, and performs control according to the photographing mode. The photographing mode further includes a still image photographing mode and a moving image photographing mode.

In either case of still image photographing or moving image photographing, the imaging units 3a and 3b output imaging signals at predetermined intervals, and the imaging signals are subjected to predetermined image signal processing in the image/audio signal processing circuit 5 through the interface circuit 4, so that the image data for display is generated. The image data for display is displayed on the display 8 in real time.

At this time, depending on which of the imaging unit 3a and the imaging unit 3b is used, the AF or a diaphragm value, and the like, the control circuit 6 controls the lens units 2a and 2b, the imaging units 3a and 3b, the interface circuit 4, the image/audio signal processing circuit 5, and the like. Incidentally, in a case where it is set to detect two states of a half depression and a full depression on the depression of the shutter, once the state of the half depression is detected, the control circuit 6 may perform control of the AF.

In the still image photographing mode, once the depression of the shutter or the full depression is detected, the control circuit 6 controls each unit according to the photographing conditions such as a shutter speed. The imaging signals of a still image imaged by the imaging units 3a and 3b are subjected to predetermined still image signal processing by the image/audio signal processing circuit 5, and are then encoded by the encoding/decoding circuit 15.

Here, the memory 12 may be used as a buffer memory when still image signal processing and encoding are performed. Further, the encoding may be, for example, any encoding into JPEG data, or encoding of MPEG data into still images. The encoded still image data is output to the recording/reproducing circuit 10 by the image/audio signal processing circuit 5, and is recorded on the recording medium 11 by the recording/reproducing circuit 10. Incidentally, without the use of the encoding/decoding circuit 15, recoding may be performed in a high-quality RAW format.

In the moving image photographing mode, once the depression of the shutter or the full depression is detected, the control circuit 6 controls each unit according to the photographing conditions. In the case of the moving image photographing mode, even though the depression of the shutter is released, the control circuit 6 continues control of the photographing. The imaging signals of a moving image imaged by the imaging units 3a and 3b are subjected to predetermined moving image signal processing by the image/audio signal processing circuit 5, and are then encoded by the encoding/decoding circuit 15.

The encoding may be, for example, any encoding into MPEG data such as H.264 or H.265, or encoding into other moving image formats. The encoded moving image data is output to the recording/reproducing circuit 10 by the image/audio signal processing circuit 5 and is recorded on the recording medium 11 by the recording/reproducing circuit 10.

Once the depression of the shutter during photographing of the moving image is detected again, the control circuit 6 terminates control of the photographing. Incidentally, the image/audio signal processing circuit 5 generates image data for display during photographing and also after photographing of the moving image, and the image data for display is displayed on the display 8 in real time.

Next, operations in the reproducing mode will be described. The control circuit 6 detects an activation instruction of the reproducing mode on an operation of the operation input unit 9 (touch panel) or the like, and performs control according to the reproducing mode. The recording/reproducing circuit 10 reads out designated data from the data recorded on the recording medium 11, the read-out data is decoded by the encoding/decoding circuit 15 through the image/audio signal processing circuit 5, and the decoded data is output to the image/audio signal processing circuit 5. The image/audio signal processing circuit 5 generates image data for display from the decoded data, and the image data for display is displayed on the display 8.

Figure 2:
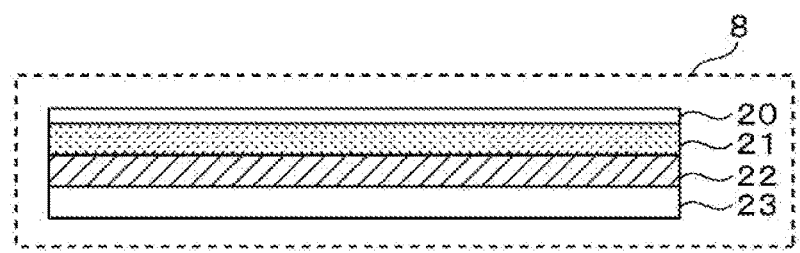
FIG. 2 is a diagram illustrating an example of a structure of a display.

FIG. 2 is a diagram illustrating an example of a cross-sectional structure of the display 8 including a liquid crystal panel 22 and a touch panel 21. The display 8 is formed by disposing the touch panel 21 on an upper surface of the liquid crystal panel 22 to integrate them, disposing a protective cover 20 such as glass on the upper surface of the touch panel 21, and disposing a backlight 23 on a lower surface of the liquid crystal panel 22.

The touch panel 21 uses, for example, an electrostatic capacitance type, and transparent electrodes are disposed in a two-dimensional orthogonal manner. Once a human finger or a touch pen is in contact with or approaches a display screen of the display 8, electrostatic capacitance between the finger or the touch pen and the transparent electrodes is changed, so that a position in the horizontal and vertical directions on the contacted screen is detected. Incidentally, display and operations of the display 8 including the touch panel 21 will be described later.

In this structure, since the electrostatic capacitance is detected through the protective cover 20, the touch panel 21 is disposed in close contact with the protective cover 20 to obtain high detection accuracy. Further, since a surface of the protective cover 20 is subjected to gloss finishing, high visibility of the display image of the liquid crystal panel 22 is obtained and a slip of the finger and the touch pen is improved. However, once the surface of the protective cover 20 is subjected to glossy finishing, a reflection amount of light from the outside is increased.

The backlight 23 emits illumination light from the back surface of the liquid crystal panel 22 to display an image. In a case where it is not necessary to display the image, the backlight 23 is controlled to be turned off, in order to reduce power consumption. The backlight 23 may be turned off over the whole of the display 8, and the backlight 23 is divided into a plurality of portions to be controlled so that a portion of the display 8 may be turned off.

Incidentally, instead of the liquid crystal panel 22 and the backlight 23, a panel such as an organic EL may be used. In the display panel using a light-emitting element such as an organic EL, the backlight is unnecessary. Further, in addition to the electrostatic capacitance type, the touch panel 21 may use a pressure sensitive type or the like.

Figure 3:
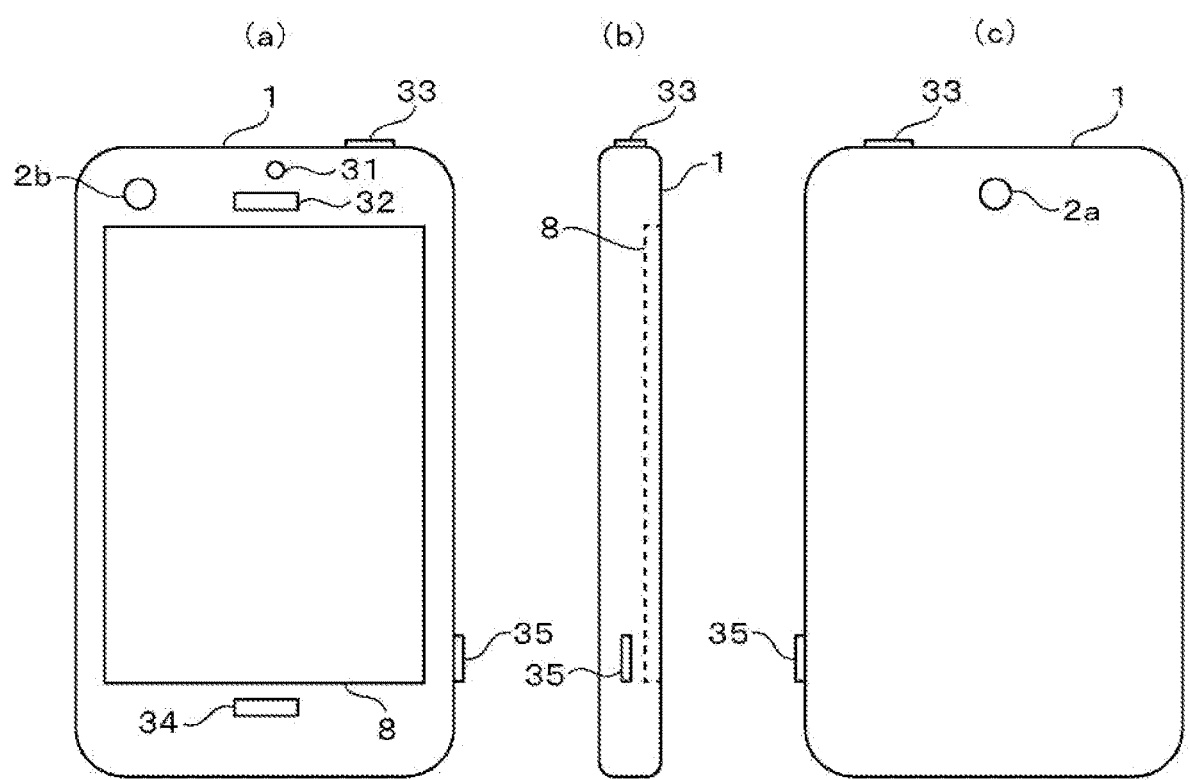
FIG. 3 is a diagram illustrating an example of an external appearance of the mobile terminal of Embodiment 1.

FIG. 3 is a diagram illustrating an example of the external appearance of the mobile terminal 1, FIG. 3(a) is a diagram of the mobile terminal 1 as seen from a back surface side, FIG. 3(b) is a diagram of the mobile terminal 1 as seen from a side surface side, and FIG. 3(c) is a diagram of the mobile terminal 1 as seen from a front surface side. The display 8 integrated with the touch panel 21 is disposed on the back surface of the mobile terminal 1.

As illustrated in FIGS. 3(a) and 3(c), the lens unit 2a of the rear camera is disposed on the front surface, and the lens unit 2b of the front camera is disposed on the back surface. FIGS. 3(a) and 3(c) illustrate that the lens units 2a and 2b is fixed on the front surface and the back surface, respectively, but may be replaced with a lens of an attachable or detachable type having a different focal length. A power switch 33 is a switch operated when activating and terminating the mobile terminal 1, and may also serve as a switch for returning to a power saving mode in the mobile terminal 1 having a power saving mode.

Since the speaker 32 and the microphone 34 are for speech communication, for example, the speaker and the microphone are disposed to be in close to the ears and the mouth of a caller in speech communication. The proximity sensor 31 is disposed to be in close to the speaker 32, for example, in order to detect the approach of a face in speech communication, and the infrared type proximity sensor has a light emitting portion and a light receiving portion for near infrared light. The proximity sensor 31 is disposed on the same surface as that of the display 8, that is, on the back surface, in order to detect that the viewer is mounted as described later. The speaker 32 and the microphone 34 are also disposed on the back surface.

A shutter 35 is a switch for instructing to perform photographing through the lens unit 2a and the shutter 35 may coexist with a shutter executed by touching a portion of the touch panel 21, or may be eliminated. The example of FIG. 3(b) is an example of the disposition of the power switch 33 and the shutter 35, without limiting to this disposition.

FIG. 4 is a diagram illustrating an example of a viewer 40 mounted on the mobile terminal 1. The viewer 40 has a structure in which the viewer is attachable to or detachable from the back surface of the mobile terminal 1. FIG. 4(a) is a diagram of the viewer 40 as seen from a back surface side, FIG. 4(b) is a diagram of the viewer 40 as seen from a side surface side, and FIG. 4(c) is a diagram of the viewer 40 as seen from a front surface side. Here, the back surface, the side surface, and the front surface are the same surfaces as those of the mobile terminal 1 illustrated in FIG. 3, but are not surfaces based on the structure of the viewer 40.

The viewer 40 includes a finder portion 42a. As illustrated in FIGS. 4(a) and 4(b), the finder portion 42a has a rectangular tube shape, that is, a shape in which four side surfaces are surrounded by substantially rectangular light shielding plates to shield light from the side surfaces. As illustrated in FIGS. 4(a) and 4(c), an opening portion 41 of the finder portion 42a is an opening portion through which light is passed from the front surface side to the back surface side of the viewer 40, and the structure of the opening portion 41 will be described later with reference to FIG. 5. A cavity portion 43 is a cavity through which light, a human finger or a touch pen is passed between the front surface side and the back surface side of the viewer 40.

The whole of the viewer 40 has a shape in which the viewer is mounted covering portions of the back surface and the side surface of the mobile terminal 1, and is formed of a material such as colored polycarbonate as a light shielding material. The viewer 40 and the mobile terminal 1 may have a shape in which the viewer and the mobile terminal are pinched between fingers to maintain a mounted state, and each of the viewer 40 and the mobile terminal 1 may have a concave portion and convex portion (not illustrated) so that the concave portion is fitted to the convex portion to maintain a mounted state.

Further, the viewer 40 has a shape in which the proximity sensor 31 detects the viewer in a state where the viewer 40 is mounted to the mobile terminal 1. Therefore, at the time of mounting, the opening portion 41 and the cavity portion 43 are not located at positions facing the proximity sensor 31, and a portion of the viewer 40 excluding the opening portion 41 and the cavity portion 43 is located facing the proximity sensor 31.

FIG. 5 is a cross-sectional view illustrating an example of the finder portion 42a. A cover glass 50 and lens 51 are fitted to the opening portion 41 of the finder portion 42a, and the side surfaces of the finder portion 42a serve as supporting members of the cover glass and lens. In a case where the display 8 is directly viewed without the viewer 40, it is performed to normally view the display 8 at a distance of about 30 cm or more from the display 8, whereas in a case where the viewer 40 is used, it is performed to view the display 8 in a state of looking into the finder portion 42a, so that the image displayed on the display 8 is enlarged by the lens 51 to adjust focus on the image.

The cover glass 50 protects the lens 51. It is preferable that the finder portion 42a extends from an eyepiece position to the cover glass 50, and it is preferable to have a shape in which the cover glass 50 is shielded from external light by the side surfaces of the finder portion 42a and a face of a person looking into the finder portion.

Figure 6A:
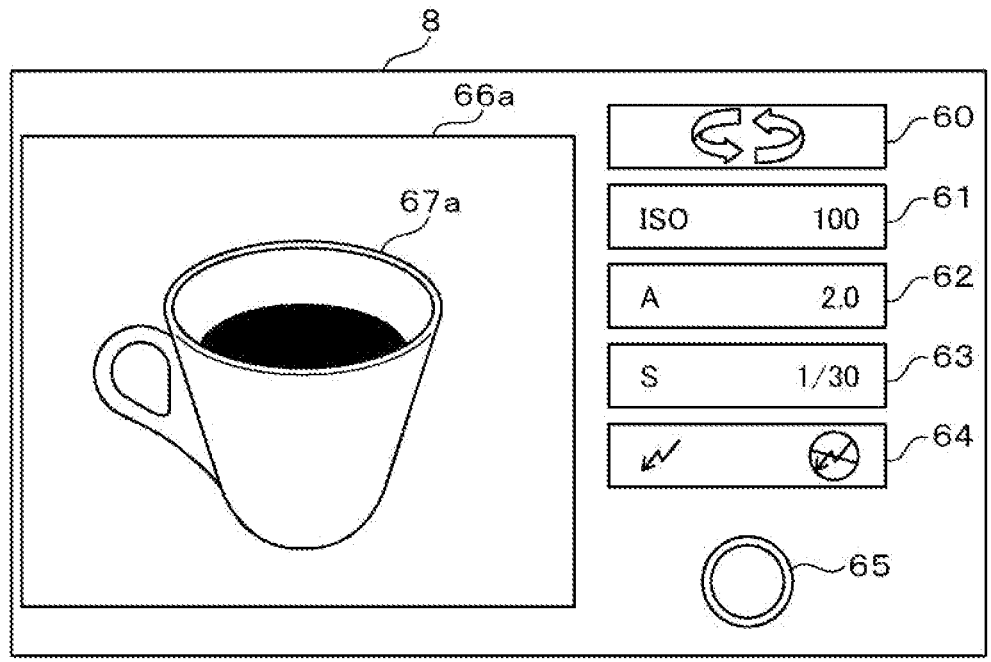
FIG. 6A is a diagram illustrating an example of a display in a case where the viewer is not mounted.
Figure 6B:
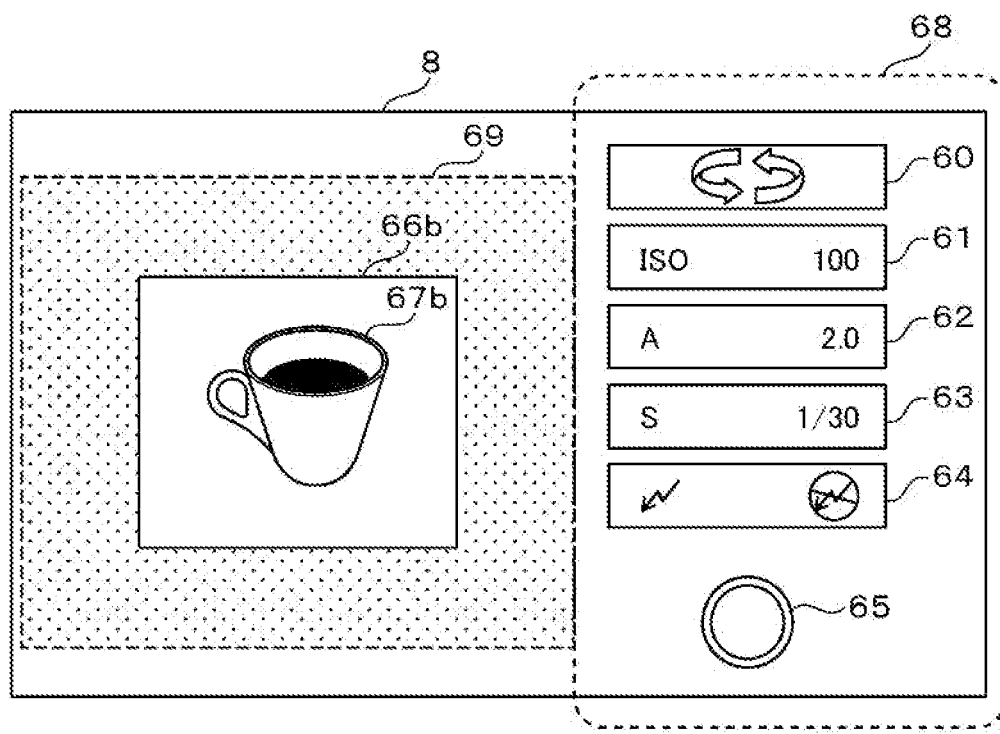
FIG. 6B is a diagram illustrating an example of a display in a case where the viewer of Embodiment 1 is mounted.

FIG. 6A is a diagram illustrating an example of a display in a case where the viewer 40 is not mounted, and FIG. 6B is a diagram illustrating an example of a display in a case where the viewer 40 is mounted. The display on the display 8 is changed depending on whether or not the viewer 40 is mounted, that is, whether or not the viewer 40 is used. In the case of the viewer 40 being not used of FIG. 6A, it is performed to directly view the display 8.

In FIG. 6A, a subject 67a is a display of a subject imaged by the imaging unit 3a. An imaging region 66a is preferably a display within a range imaged by the imaging unit 3a, but may be a display within a range of a portion obtained by clipping the periphery. Further, the display of the subject 67a and the imaging region 66a may be reduced and displayed according to a ratio between the number of pixels of the imaging units 3a and 3b and the number of pixels of the display 8.

Setting buttons 60 to 64 are a display of various setting buttons, and a shutter button 65 is a display of a button corresponding to a shutter. The setting button 60 is a button for switching between the front camera and the rear camera, the setting button 61 is a button for changing an ISO sensitivity, the setting button 62 is a button for changing a diaphragm value, the setting button 63 is a button for changing a shutter speed, and the setting button 64 is a button for setting a flash.

These setting buttons 60 to 64, which are operation menus for setting the camera, are displayed on the display 8. Once it is detected that a position corresponding to a display is touched on the touch panel 21 of the operation input unit 9, the setting is changed by the processing of the control circuit 6. For example, each time the setting button 60 is touched, the rear camera and the front camera are switched.

Further, in a case where the setting button 61 is touched, a selectable ISO sensitivity is displayed by horizontal scrolling, and in a case where a selection is made by touch, the ISO sensitivity is changed. The diaphragm value of the setting button 62 and the shutter speed of the setting button 63 also operate in the same manner as the setting button 61. Each time the setting button 64 is touched, the setting button 64 is set to ON (forced light emission), OFF (light emission prohibition), or automatic light emission (light emission control according to brightness).

Incidentally, these setting buttons 60 to 64 are examples of operation menus, and menus for changing an optional setting and setting buttons such as changing a mode to a photographing mode including moving image photographing, or a reproducing mode, a focusing mode, and white balance may be displayed. The shutter button 65 is the same operation as the shutter 35 and may be combined with the shutter 35.

Further, when the image imaged by the imaging unit 3b as the front camera is displayed on the display 8, the image is displayed as a mirror image, and the other images are normally displayed as normal images. Then, the display and operations of FIG. 6A may be a general display and operations of the smartphone.

In the display of FIG. 6B, the same displays as those in FIG. 6A are denoted by the same reference numerals, and the descriptions thereof will not be repeated. A region 68 is a region corresponding to the cavity portion 43, and even in a state where the viewer 40 is mounted, the region 68 can be viewed directly and can be touched through the cavity portion 43. The display of the setting buttons 60 to 64 and the shutter button 65 in FIG. 6B is illustrated as an example of the same displays as those in FIG. 6A, but may be reduced and displayed, as compared with the display of FIG. 6A, to fit in the region 68.

In a case where the viewer 40 is mounted, the setting button 60 for switching between the rear camera and the front camera may not be displayed using only the rear camera, or the setting button 60 may be grayed out not to be selectable. Further, in a case where it is detected that the viewer 40 is mounted, the setting buttons 60 to 64 may be changed to different operation menus.

A subject 67b and an imaging region 66b correspond to the subject 67a and the imaging region 66a, respectively, and the same image data is used and displayed as an image display by one operation of the shutter 35 or the shutter button 65. Here, in a case where the subject 67a and the imaging region 66a are displayed at equal magnification, the subject 67b and the imaging region 66b are reduced and displayed, and in a case where the subject 67a and the imaging region 66a are reduced and displayed, the subject 67b and the imaging region 66b are reduced and displayed to be smaller, as compared with the reduced display of the subject 67a and the imaging region 66a. This reduction is performed by the image/audio signal processing circuit 5.

It is preferable that a size of the imaging region 66b is large enough to sufficiently confirm the image displayed in the imaging region 66b from corner to corner, due to enlargement by the lens 51. For example, a magnification setting button is also displayed on the operation menus of the setting buttons 60 to 64, and a reduction magnification for this size may be set by a touch operation. Further, a distance from the display 8 to the lens 51, a distance from the lens 51 to an eye looking into the lens, a focal length of the lens 51, and the like are preset, and a size and resolution and the like of a screen of the display 8 are acquired, so that the reduction magnification may be calculated.

The periphery display of the imaging region 66b, that is, a hatched portion of a region 69, may be displayed with a reduced brightness or black. For this display, the liquid crystal panel 22 may be controlled, or the backlight 23 may be controlled.

The mounting of the viewer 40 is detected by the proximity sensor 31. For example, once the proximity sensor 31 detects a proximity object to be within a range of a preset distance longer than a preset time in a state where the photographing mode is set, the control circuit 6 may perform control of changing a display to another display illustrated in FIG. 6B. That is, the control circuit 6 may perform control of reducing the imaging region 66b including the subject 67b and displaying the region 69 with a reduced display brightness.

Further, the removal of the viewer 40 is also detected by the proximity sensor 31. For example, once the proximity sensor 31 does not detect a proximity object to be within a range of a preset distance longer than a preset time in a state where the photographing mode is set, the control circuit 6 may perform control of changing a display to the display illustrated in FIG. 6A. Incidentally, the setting button for switching is also displayed on the operation menus of the setting buttons 60 to 64, and may control switching between the display illustrated in FIG. 6A and the display illustrated in FIG. 6B by a touch operation.

When a still image or a moving image is photographed, there is a case where bright surroundings make it difficult for the screen of the display 8 to be viewed. In such a case, since the viewer 40 is mounted to improve a light shielding property, it is easy to confirm the image of the subject 67b even in the bright surroundings.

Figure 7A:
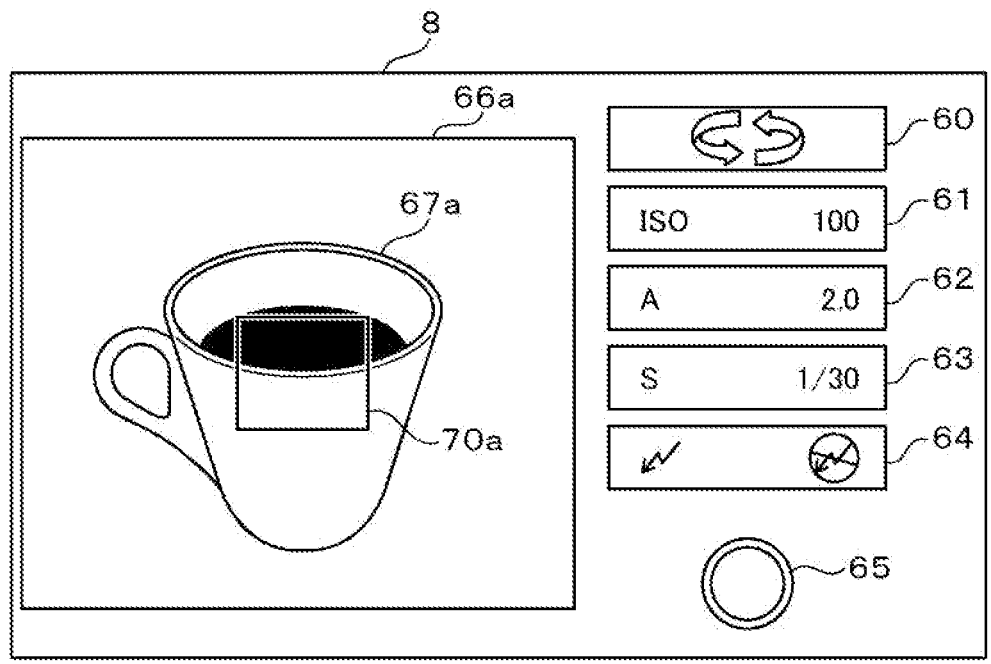
FIG. 7A is a diagram illustrating an example of a focus setting region frame in a case where the viewer is not mounted.

FIG. 7A is a diagram illustrating an example of a display including a focus setting region frame 70a in a case where the viewer 40 is not mounted. In the display of FIG. 7A, the same displays as those in FIG. 6A are denoted by the same reference numerals, and the descriptions thereof will not be repeated. In the display illustrated in FIG. 6A, for example, once the touch panel 21 detects that an optional position in the display of the imaging region 66a is touched, the control circuit 6 displays the focus setting region frame 70a by focusing on a distance to an imaging target corresponding to the touched position.

Figure 7B:
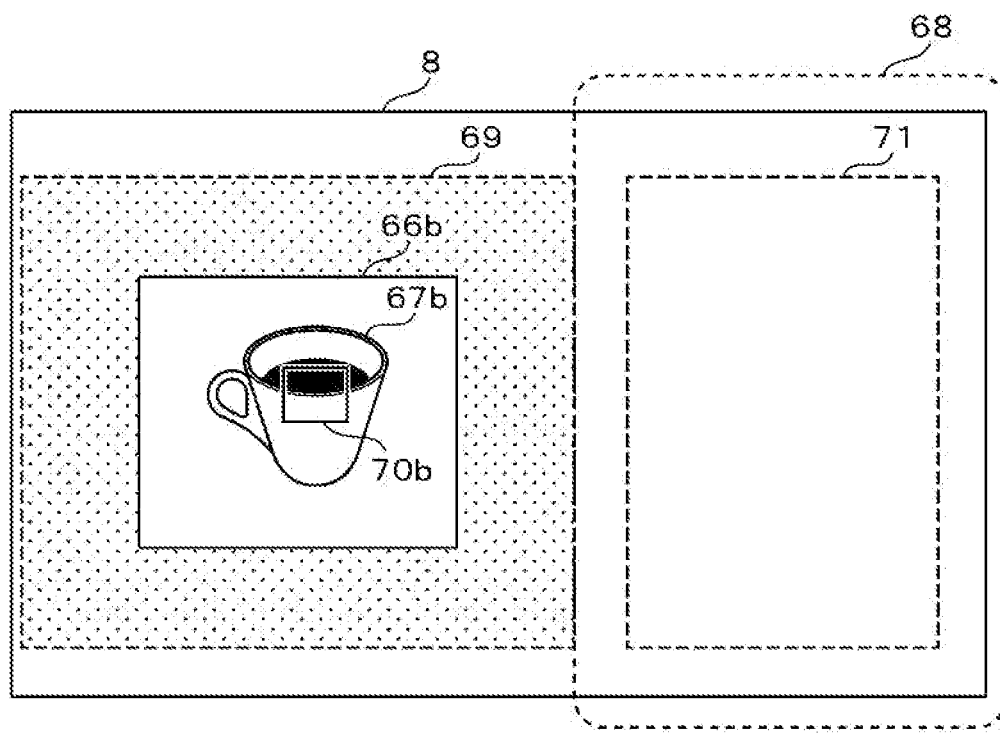
FIG. 7B is a diagram illustrating an example of a focus setting region frame in a case where the viewer of Embodiment 1 is mounted.

FIG. 7B is a diagram illustrating an example of a display including a focus setting region frame 70b in a case where the viewer 40 is mounted. In the display of FIG. 7B, the same displays as those in FIG. 6B are denoted by the same reference numerals, and the descriptions thereof will not be repeated. A touch pad region 71 is touched through the region 68 corresponding to the cavity portion 43 and the control circuit 6 performs control of moving a position of the focus setting region frame 70b in the imaging region 66b according to a touched position in the region 68.

In this way, it is possible to move the position of the focus setting region frame 70b in the display of the imaging region 66b, even though the cover glass 50 cannot be touched due to the mounting of the viewer 40. Further, icons and the like corresponding to the setting buttons 60 to 64 illustrated in FIG. 7A are displayed in the display of the imaging region 66b, and the control circuit 6 may perform control such that icons and the like are selectable according to the position of the focus setting region frame 70b.

Figure 8:
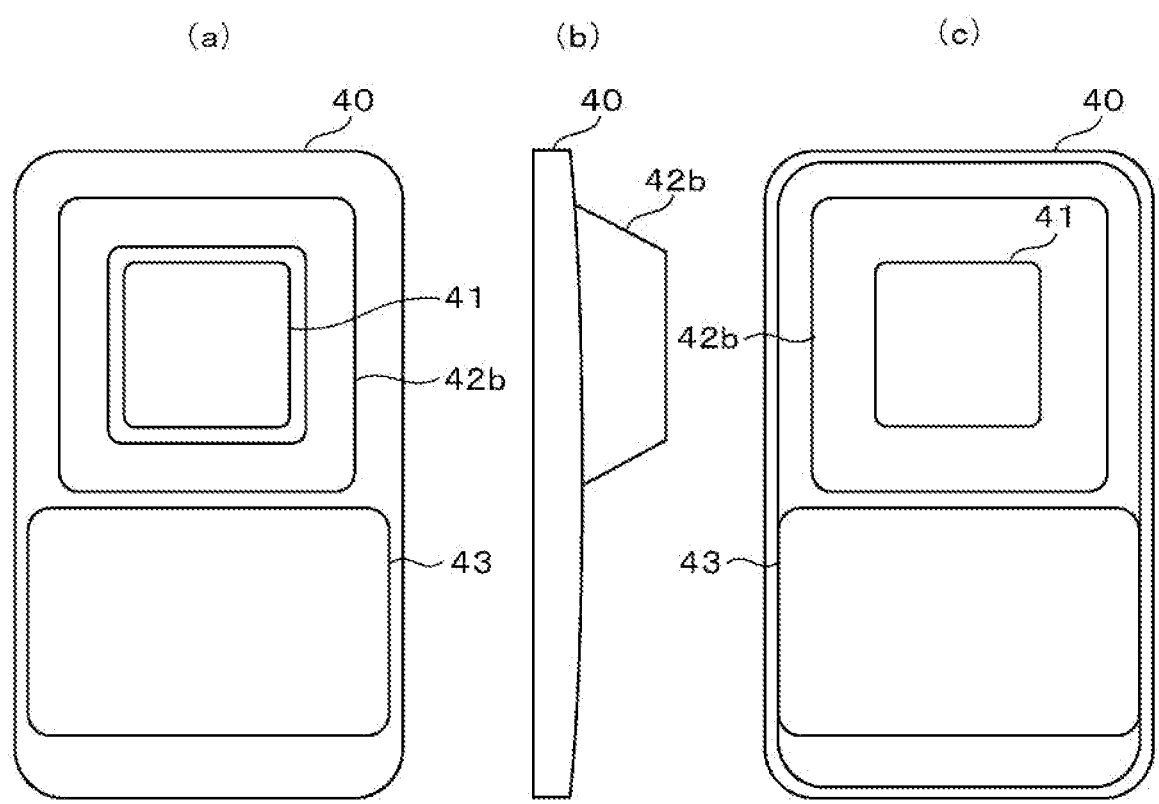
FIG. 8 is a diagram illustrating another example of the viewer of Embodiment 1.

FIG. 8 is a diagram illustrating another example of the viewer 40. FIG. 8(a) is a diagram of the viewer 40 as seen from the back surface side, FIG. 8(b) is a diagram of the viewer 40 as seen from the side surface side, and FIG. 8(c) is a diagram of the viewer 40 as seen from the front surface side. In FIG. 8, the same structures as those in FIG. 4 are denoted by the same reference numerals, and the descriptions thereof will not be repeated. FIG. 8 illustrates a different shape of the finder portion 42b, as compared with FIG. 4.

In the example illustrated in FIG. 4, each of the side surfaces of the finder portion 42a is substantially rectangular, but in the example illustrated in FIG. 8, each of the side surfaces of the finder portion 42b is substantially trapezoidal. That is, as the opening portion 41 approaches the display 8, the opening portion becomes wider. In this way, in the case of looking into the finder portion 42b, an inside of the finder portion 42b, that is, a visible region of an inside surface on an opening portion 41 side is reduced, and the display regions of the imaging region 66b illustrated in FIGS. 6B and 7B are widened, so that there are a case where the number of pixels in the display region is easy to be increased. Further, since the side surface of the finder portion 42b is substantially trapezoidal, a physical structural strength also is enhanced.

As described above, according to the present embodiment, in the mobile terminal 1 which has the display 8 such as a liquid crystal panel but does not have the electronic viewfinder, the same functions and effects as the viewfinder are obtained only by mounting the viewer 40. Here, the viewer 40 does not include display components unlike the electronic viewfinder, so that a simple structure and a low cost are obtained.

Further, since it is possible to eliminate, through image processing of the mobile terminal 1, a portion in which the display of the imaging region 66a cannot be confirmed resulting from the mounting of the viewer 40, the viewer 40 can be substantially used. Then, since it is possible to automatically switch a display when the viewer 40 is mounted or not mounted, it is possible to provide a user-friendly mobile terminal. Further, even though the viewer 40 is mounted, it is possible to move a manual focus setting region frame.

Embodiment 2

Figure 9:
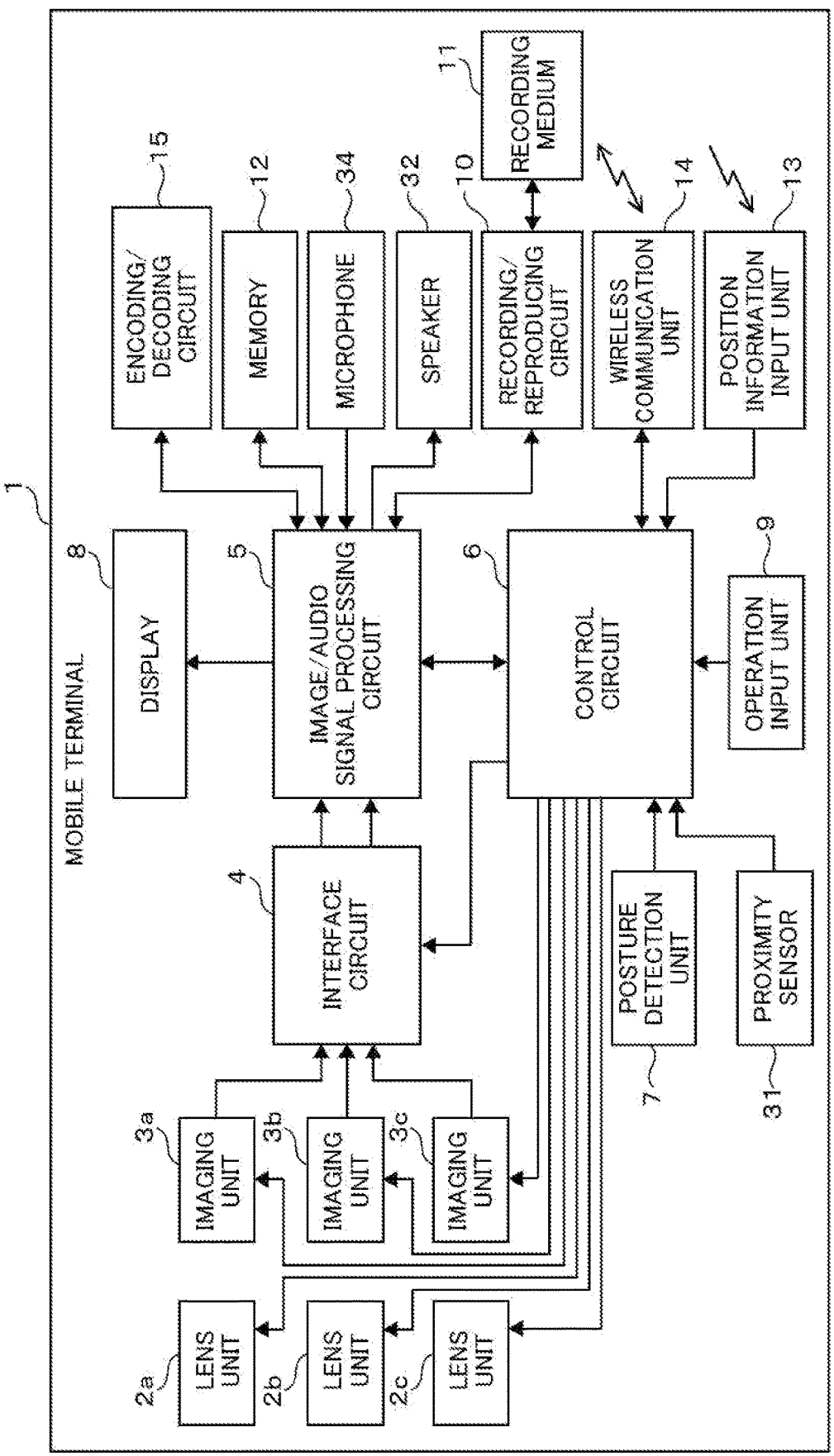
FIG. 9 is a block diagram illustrating an example of a configuration of a mobile terminal of Embodiment 2.

In Embodiment 1, the example of one rear camera has been described, but in Embodiment 2, an example of two rear cameras will be described. FIG. 9 is a block diagram illustrating an example of the configuration of the mobile terminal 1 of Embodiment 2. In FIG. 9, the same structures as those in FIG. 1 are denoted by the same reference numerals and the descriptions thereof will not be repeated. In FIG. 1, two lens units 2a and 2b corresponding to the front camera and the rear camera, and two imaging units 3a and 3b are provided, whereas in the example of FIG. 9, a lens unit 2c and an imaging unit 3c are further provided.

The lens unit 2c and the imaging unit 3c are combined with the lens unit 2a and the imaging unit 3a, so that the front camera can cope with stereo imaging or the like. For example, the imaging unit 3a and the imaging unit 3b are controlled to perform imaging at the same timing, and the interface circuit 4 outputs both input signals from the imaging units 3a and 3c to the image/audio signal processing circuit 5. Further, the image/audio signal processing circuit 5 generates image data for display based on both input signals and outputs the image data to the display 8. This display will be described later.

Figure 10:
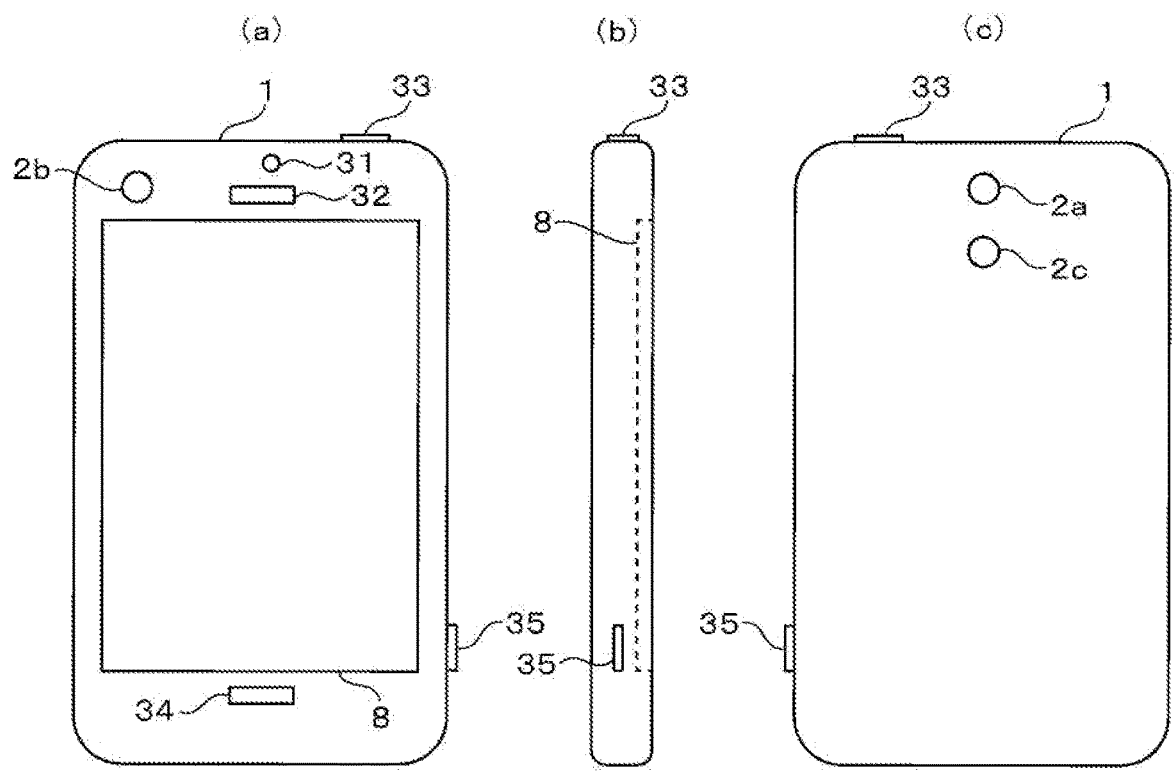
FIG. 10 is a diagram illustrating an example of an external appearance of the mobile terminal of Embodiment 2.

FIG. 10 is a diagram illustrating an example of the external appearance of the mobile terminal 1 of Embodiment 2. FIG. 10(a) is a diagram of the mobile terminal 1 as seen from the back surface side, FIG. 10(b) is a diagram of the mobile terminal 1 as seen from the side surface side, and FIG. 10(c) is a diagram of the mobile terminal 1 as seen from the front surface side. In FIG. 10, the same structures as those in FIG. 3 are denoted by the same reference numerals, and the descriptions thereof will not be repeated. In FIG. 3, the lens unit 2a of the rear camera is provided, but in the example of FIG. 10, the lens unit 2a and the lens unit 2c of the rear camera are provided.

The lens unit 2a and the lens unit 2c are disposed at a predetermined interval in a longitudinal direction on the front surface of the mobile terminal 1. Incidentally, disposition in the longitudinal direction is for performing photographing by using the mobile terminal 1 sideways. Although disposition is not limited thereto, it is preferable to dispose the lens units side by side in a long side direction of the display 8.

Figure 11:
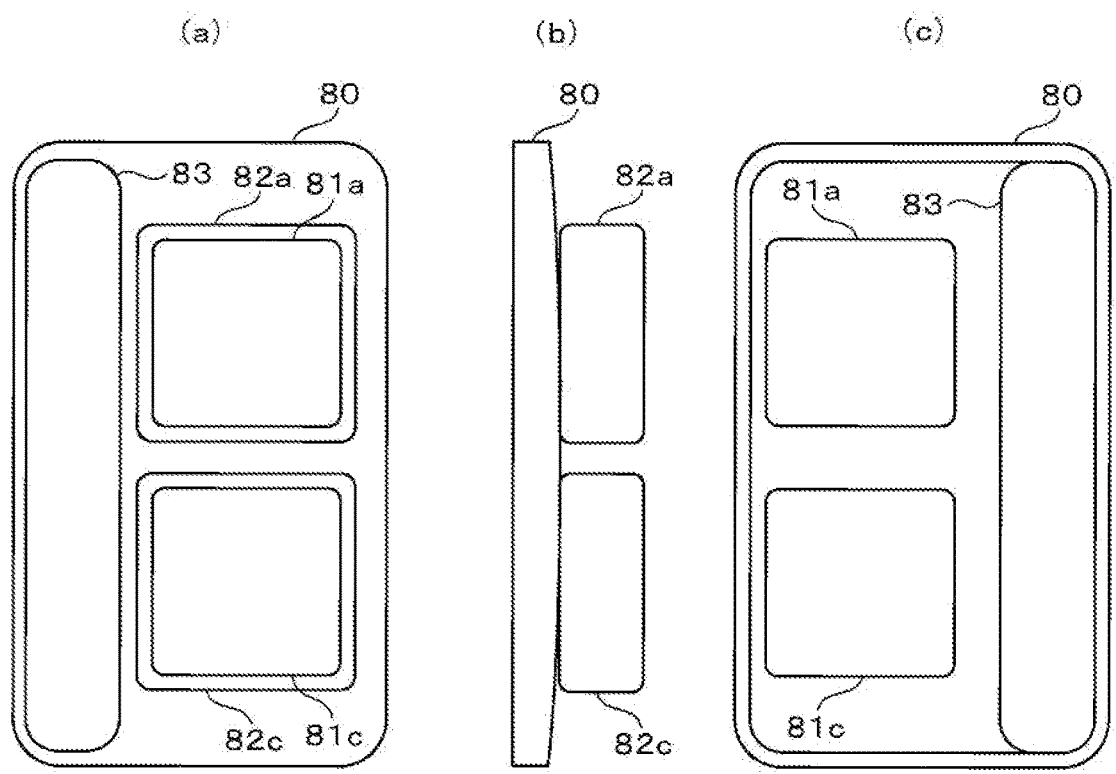
FIG. 11 is a diagram illustrating an example of a viewer of Embodiment 2.

FIG. 11 is a diagram illustrating an example of a viewer 80 of Embodiment 2. The viewer 40 has a structure in which the viewer is attachable to or detachable from the back surface of the mobile terminal 1. Incidentally, it is preferable that the viewer is mounted on the mobile terminal 1 illustrated in FIGS. 9 and 10 of the present embodiment, and the viewer is mounted on the mobile terminal 1 illustrated in FIGS. 1 and 3 of Embodiment 1, so that the viewer may be used for reproducing and displaying a 3D image.

The viewer 80, which is mounted on the mobile terminal 1 illustrated in FIGS. 9 and 10 of the present embodiment, is used for 3D photographing by which images corresponding to a right eye and a left eye are simultaneously photographed by the two imaging units of the imaging unit 3a and the imaging unit 3c. Further, in reproducing, this viewer 80 is used for viewing 3D images. FIG. 11(a) is a diagram of the viewer 80 as seen from the back surface side, FIG. 11(b) is a diagram of the viewer 80 as seen from the side surface side, and FIG. 11(c) is a diagram of the viewer 80 as seen from the front surface side.

As illustrated in FIGS. 11(a) and 11(b), each of the finder portions 82a and 82c has a rectangular tube shape, that is, a shape in which four side surfaces are surrounded by substantially rectangular light shielding plates to shield light from the side surfaces. Further, each of opening portions 81a and 81c of the finder portions 82a and 82c is an opening portion through which light is passed from the front surface side to the back surface side of the viewer 80. A cavity portion 83 is a cavity through which light, a human finger or a touch pen is passed between the front surface side and the back surface side of the viewer 80.

The finder portion 82a and the finder portion 82c are disposed at a predetermined interval in the longitudinal direction on the back surface of the viewer 80. This corresponds to the disposition of the lens units 2a and 2c illustrated in FIG. 10(c), and when photographing is performed by using the mobile terminal 1 sideways, each of the finder portion 82a and the finder portion 82c is disposed to be viewed by a left eye and a right eye. Incidentally, in order to increase area of the opening portions 81a and 81c, it is preferable to dispose the finder portions side by side in the long side direction of the display 8. The structure of each of the finder portions 82a and 82c is the same as described with reference to FIG. 5.

In FIGS. 11(a) and 11(c), there is illustrated an example in which, when photographing is performed by using the mobile terminal 1 sideways, the cavity portion 83 is disposed at a position where the touch panel 21 is easy to be operated by a thumb. However, the cavity portion is limited thereto, and may be disposed anywhere as long as a position is easy to be operated other than the finder portions 82a and 82c. However, the opening portions 81a and 81c and the cavity portion 83 are preferably disposed such that a portion of the viewer 80 other than the opening portions 81a and 81c and the cavity portion 83 is detected by the proximity sensor 31 at the time of mounting.

Figure 12A:
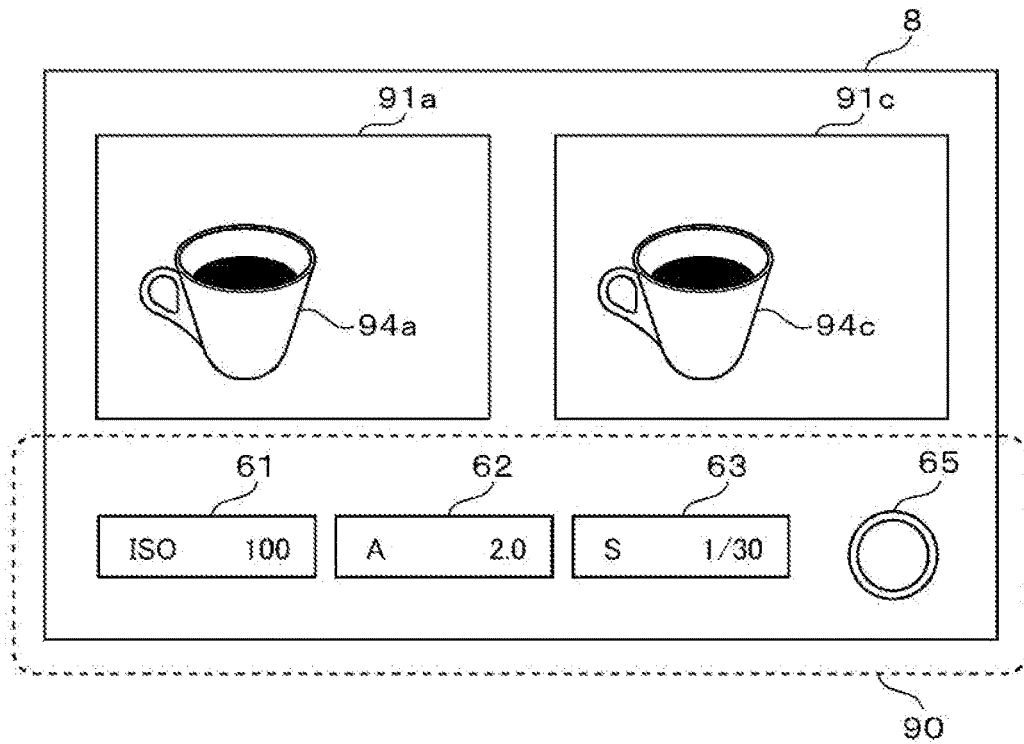
FIG. 12A is a diagram illustrating an example of a display of a photographing mode of Embodiment 2.

FIG. 12A is a diagram illustrating an example of a display of the photographing mode in a case where the viewer 80 is mounted. On the display 8, imaging regions 91*a* and 91*c*, the setting buttons 61 to 63, and the shutter button 65 are displayed, but the setting buttons 61 to 63 and the shutter button 65 are the same as described with reference to FIG. 6A. Then, the setting buttons 61 to 63 and the shutter button 65 are displayed in a region 90 corresponding to the cavity portion 83.

Each of the imaging region 91*a* and the imaging region 91*c* is a display of the range imaged by the imaging unit 3*a* and the imaging unit 3*c*. When the viewer 80 is mounted, the imaging regions are displayed at positions where the display of the imaging region 91*a* is viewed through the opening portion 81*a*, and the display of the imaging region 91*c* is viewed through the opening portion 81*c*. Although a subject 94*a* and a subject 94*c* are the same objects, the images are imaged by the imaging unit 3*a* and the imaging unit 3*c*, so that the images are displayed from positions having different angles.

Then, the image data, which has been imaged and obtained by the imaging unit 3*a*, is displayed as the subject 94*a* in the imaging region 91*a*, so that the display of the subject 94*a* is viewed through the finder portion 82*a* by the left eye, and the image data, which has been imaged and obtained by the imaging unit 3*c*, is displayed as the subject 94*c* in the imaging region 91*c*, so that the display of the subject 94*a* is viewed through the finder portion 82*c* by the right eye. In this way, the image data can be viewed as 3D images.

Incidentally, in a case where the viewer 80 is not mounted in the photographing mode, the image data cannot be viewed as 3D images, so that there may be provided a display including the imaging region 66*a* illustrated in FIG. 6A, instead of two displays of the imaging region 91*a* and the imaging region 91*c*. In order to display the imaging region 66*a*, image data, which has been imaged and obtained by either the imaging unit 3*a* or the imaging unit 3*c*, may be displayed.

The display of each of the imaging region 91*a* and the imaging region 91*c* is smaller than the display of the imaging region 66*a* and the display of each of the subject 94*a* and the subject 94*c* may be reduced to be smaller than the display of the subject 67*a*. The display size of the imaging region 91*a* and the imaging region 91*c* may be the same size. Further, the mounting of the viewer 80 may be detected by the proximity sensor 31 and the display screen may be switched.

Figure 12B:
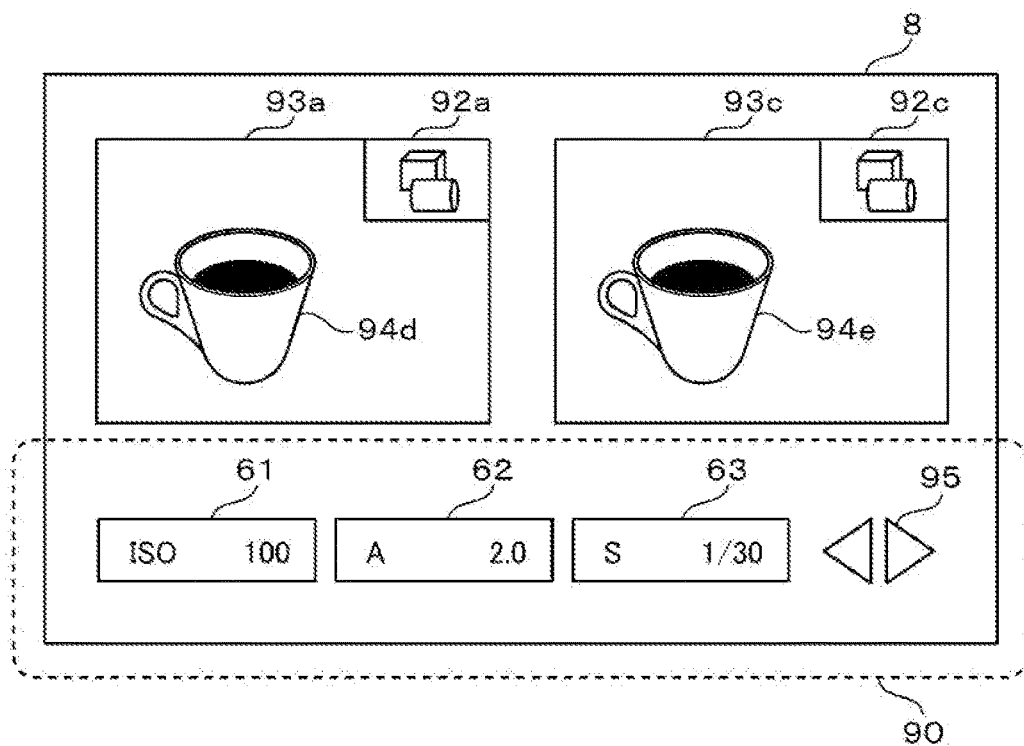
FIG. 12B is a diagram illustrating an example of a display in a reproducing mode of Embodiment 2.

FIG. 12B is a diagram illustrating an example of the display of the reproducing mode in a case where the viewer 80 is mounted. In the display of FIG. 12B, the same displays as those in FIG. 12A are denoted by the same reference numerals, and the descriptions thereof will not be repeated. However, the setting buttons 61 to 63 may be operation menus for reproduction. Alternatively, the setting buttons may be a display of setting contents at the time of photographing an image to be reproduced. A selection button 95 for a recorded image, which has been displayed instead of the shutter button 65, is a display for input used for selecting an image to be reproduced.

The display regions 93*a* and 93*c* are displays of images to be reproduced, and in a case where imaging is performed in the display state illustrated in FIG. 12A, subjects 94*d* and 94*e* are displayed in the same way as the subjects 94*a* and 94*c* illustrated in FIG. 12A. Further, the display regions 93*a* and 93*c* are displayed at the same positions as the imaging regions 91*a* and 91*c*. In this way, the image data can be seen as 3D images in the same way as described with reference to FIG. 12A.

The imaging regions 92*a* and 92*c* are displays of images imaged by the imaging units 3*a* and 3*c*. Also, in the reproducing mode, imaging is performed by the imaging units 3*a* and 3*c*, and the imaged image is combined with a portion of the display regions 93*a* and 93*c* in real time to be displayed. In a case where the viewer 80 is used at the time of reproduction, light is shielded by the finder portions 82*a* and 82*c*, so that the surroundings are not viewed. However, the imaging regions 92*a* and 92*c* are superimposed and displayed on the display regions 93*a* and 93*c*, so that it is possible to confirm the surrounding situations while viewing 3D reproduction images. This synthesis and superimposition may be performed by the image/audio signal processing circuit 5.

Incidentally, the display of the imaging regions 92*a* and 92*c* in the reproducing mode may be switched on or off by a setting button or the like (not illustrated). Further, in the photographing mode, a reproduction image may be superimposed and displayed on a portion of the imaging regions 91*a* and 91*c*.

Since a positional relationship between the lens units 2*a* and 2*c*, the mobile terminal 1, and the viewer 80 mounted on the mobile terminal 1 is fixed, in the photographing mode, the viewer 80 is in a state of looking into a direction in which the lens units 2*a* and 2*c* are directed. Also, in the reproducing mode, as in this state, the display images of the display regions 93*a* and 93*c* may be changed according to the direction in which the lens units 2*a* and 2*c* are directed.

Here, the direction in which the lens units 2*a* and 2*c* are directed is also a direction of the viewer 80 and the mobile terminal 1, a posture of the mobile terminal 1 is detected by the posture detection unit 7, and a viewing direction of the viewer 80 mounted on the mobile terminal 1 is specified. Then, for example, out of the image data obtained by imaging at a super wide angle, that is, the image data recorded in a photographing direction, an image is cut out according to the direction in which the viewer 80 is directed, and the cut out image may be displayed in the display regions 93*a* and 93*c*.

The image data obtained by imaging at a super wide angle may be obtained by imaging by the mobile terminal 1 with the lens units 2*a* and 2*c* using super wide angle lenses, or the images obtained by imaging by other apparatuses may be taken in. Further, for example, it is possible to reproduce image data of so-called full sky type images having a field angle of 360 degrees, and to view the images in 3D in a direction corresponding to the direction in which the viewer 80 is directed while observing the images using the viewer 80, so that the user can enjoy images with realistic feelings.

Incidentally, also in this case, as described with reference to FIG. 12B, since the images imaged by the imaging units 3*a* and 3*c* are superimposed and displayed on the reproduction image, it is possible to confirm the surrounding situations and to enhance safety. Further, the images are imaged by one of the imaging unit 3*a* and the imaging unit 3*c* of the mobile terminal 1 illustrated in FIGS. 9 and 10 of the present embodiment, so that a display may be performed as illustrated in FIGS. 6A, 6B, 7A, and 7B of Embodiment 1. The viewer 40 illustrated in FIG. 4 and the viewer 80 illustrated in FIG. 11 may be selectively used depending on whether either or both of the imaging unit 3*a* and the imaging unit 3*b* is used.

According to Embodiment 2, as described above, it is possible to view an imaging target in 3D images in photographing of the 3D images and also view the 3D images in the reproduction of the 3D images by the viewer 80. In particular, it is not necessary to provide two electronic viewfinders, and it is possible to use the viewer 80 with a simple structure and at a low cost.

Incidentally, in Embodiments 1 and 2, the mobile terminal 1 includes a general-purpose machine such as a tablet terminal or smartphone having an imaging unit. However, in addition to these, the present invention is also applicable to an imaging apparatus including a dedicated machine for mainly imaging, such as a digital camera or a video camera.

According to the present invention, a portion of the display can be used in the same manner as the electronic viewfinder by mounting the viewer on the mobile terminal having the imaging unit. Therefore, it is easy to monitor images even in bright outdoors. Further, the display screen may be automatically switched between a case where the viewer is used and a case where the viewer is not used. Thereby, it is possible to provide a user-friendly mobile terminal and an imaging apparatus.

REFERENCE SIGNS LIST

1 Mobile terminal
2a, 2b, 2c Lens unit
3a, 3b, 3c Imaging unit
4 Interface circuit
8 Display
31 Proximity sensor
40, 80 Viewer
42a, 42b, 82a, 82c Finder portion
43, 83 Cavity portion

The invention claimed is:

1. A method for using a mobile terminal,
the mobile terminal comprising: a camera; a display integrated with a touch panel; a sensor; a signal processor which, from a signal output by the camera, generates information to be displayed by the display; and a controller into which a signal from the sensor is input and which controls the signal processor, wherein a display state of the display based on the control performed by the controller includes (1) a first display state for display in a first display region if no detection signal is being input from the sensor, and (2) a second display state for display in a second display region if a detection signal is being input from the sensor,
the method comprising:
displaying a setting button outside the first display region;
displaying a focus setting region frame according to a touch detected by the touch panel in the first display region; and
detecting a touch of a position of the displayed setting button.

2. The method according to claim 1,
wherein the sensor is a proximity sensor, and
wherein the controller, into which no detection signal is being input from the sensor if no object is provided close to the sensor, and a detection signal is being input from the sensor if an object is provided close to the sensor, is configured.

3. The method according to claim 1, wherein the second display region is smaller than the first display region.

4. The method according to claim 3, wherein a periphery of the second display region has a low display brightness.

5. The method according to claim 4, wherein an image displayed in the second display region is reduced to be smaller than an image displayed in the first display region.

6. The method according to claim 1, further comprising:
detecting a touch of a position outside the second display region, and
displaying a focus setting region frame in the second display region according to a touch detected at a position outside the second display region.

7. A method for using a mobile terminal,
the mobile terminal comprising: a first camera; a second camera; a display; a sensor; a signal processor which, from a signal output by the first camera and/or the second camera, generates information to be displayed by the display; and a controller into which a signal from the sensor is input and which controls the signal processor, wherein a display state of the display based on the control performed by the controller includes (1) a first display state for display in a first display region if no detection signal is being input from the sensor, and (2) a second display state for display in a second display region and a third display region if a detection signal is being input from the sensor,
the method comprising:
generating information to be displayed in the second display region, from a signal output by the first camera, and
generating information to be displayed in the third display region, from a signal output by the second camera.

8. The method according to claim 7,
wherein the sensor is a proximity sensor, and
wherein the controller, into which no detection signal is being input from the sensor if no object is provided close to the sensor, and a detection signal is being input from the sensor if an object is provided close to the sensor, is configured.

9. The method according to claim 7, wherein the signal processor generates information to be displayed in the first display region, from a signal output by the first camera or the second camera.

10. The method according to claim 7, wherein the second display region and the third display region are smaller than the first display region.

11. The method according to claim 10, wherein an image displayed in the second display region and the third display region is reduced to be smaller than an image displayed in the first display region.

12. A method for using a mobile terminal,
the mobile terminal comprising: a first camera; a second camera; a display integrated with a touch panel; a sensor; a signal processor which, from a signal output by the first camera and/or the second camera, generates information to be displayed by the display; and a controller into which a signal from the sensor is input and which controls the signal processor, wherein a display state of the display based on the control performed by the controller includes (1) a first display state for display in a first display region if no detection signal is being input from the sensor, and (2) a second display state for display in a second display region and a third display region if a detection signal is being input from the sensor,
the method comprising:
displaying a setting button outside the second display region and the third display region, and detecting a touch of a position of the displayed setting button.

13. The method according to claim 12, further comprising a recorder that stores image information,
   wherein the signal processor
      generates information to be stored in the recorder from signals output by the first camera and the second camera, and
      generates information for superimposing and displaying the information to be displayed by the display and the information stored in the recorder from the signals output by the first camera and the second camera.

14. The method according to claim 12,
   wherein the sensor is a proximity sensor, and
   wherein the controller, into which no detection signal is being input from the sensor if no object is provided close to the sensor, and a detection signal is being input from the sensor if an object is provided close to the sensor, is configured.

15. The method according to claim 12, wherein the signal processor generates information to be displayed in the first display region, from a signal output by the first camera or the second camera.

16. The method according to claim 12, wherein the second display region and the third display region are smaller than the first display region.

17. The method according to claim 12, wherein an image displayed in the second display region and the third display region is reduced to be smaller than an image displayed in the first display region.

* * * * *